United States Patent [19]

Hamane et al.

[11] Patent Number: 4,557,345
[45] Date of Patent: Dec. 10, 1985

[54] MOTORCYCLE ENGINE COOLING SYSTEM

[75] Inventors: Masumi Hamane; Takanori Onda, both of Saitama, Japan

[73] Assignee: Honda Giken Kogyo Kabushiki Kaisha, Tokyo, Japan

[21] Appl. No.: 530,853

[22] Filed: Sep. 9, 1983

[30] Foreign Application Priority Data

Sep. 11, 1982 [JP] Japan ................................. 57-158380
Sep. 11, 1982 [JP] Japan ................................. 57-158381

[51] Int. Cl.⁴ .......................................... B60K 11/04
[52] U.S. Cl. ................................. 180/229; 180/68.1; 280/289 A
[58] Field of Search ............... 180/229, 219, 225, 226, 180/228, 230, 68.1; 280/289 A; 165/41, 44, 51, 53, 54

[56] References Cited

U.S. PATENT DOCUMENTS 4,445,587  5/1984  Hillman ..................... 180/229

FOREIGN PATENT DOCUMENTS 892724   10/1953  Fed. Rep. of Germany ...... 180/229
57-140224 8/1982  Japan .................................. 180/229
58-8427   1/1983  Japan .................................. 180/229
141194   4/1920  United Kingdom ................ 180/229
1537233  12/1978 United Kingdom ............ 280/289 A Primary Examiner—John A. Pekar
Attorney, Agent, or Firm—Lyon & Lyon

[57] ABSTRACT

A motorcycle having a water-cooled engine. The cooling system includes a radiator located in a hollow front leg shield of the motorcycle. The radiator may be positioned on one side of the down tube while a radiator tank is located on the other. A damper mechanism is disclosed which allows selected flow of heated air from the radiator to be directed toward the rider for warmth. Alternately, heated air flows from the radiator downwardly from the hollow interior of the front leg shield.

15 Claims, 12 Drawing Figures

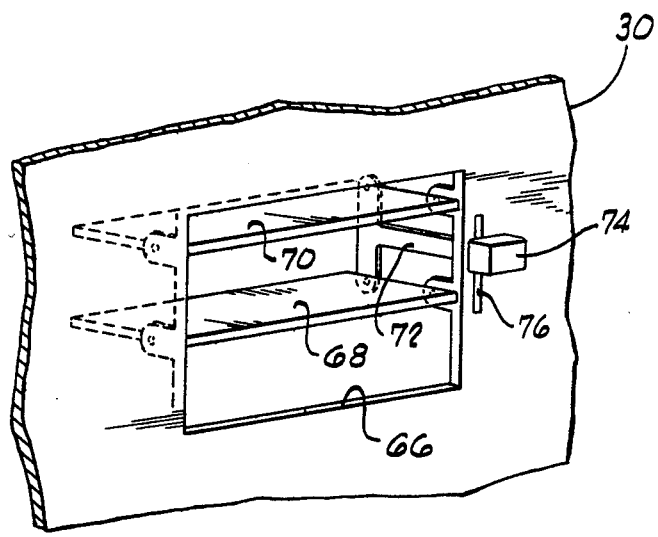
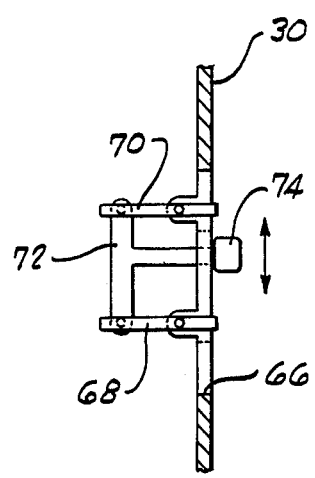
FIG. 4A  FIG. 4B
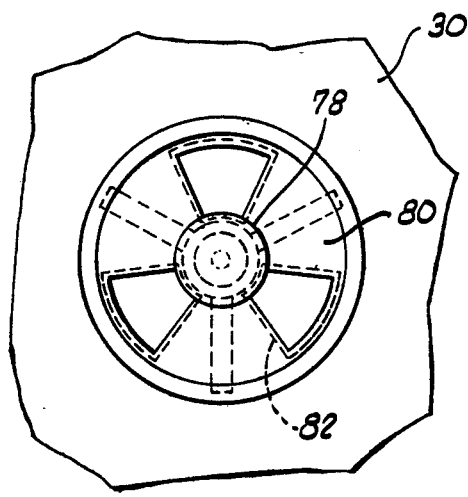
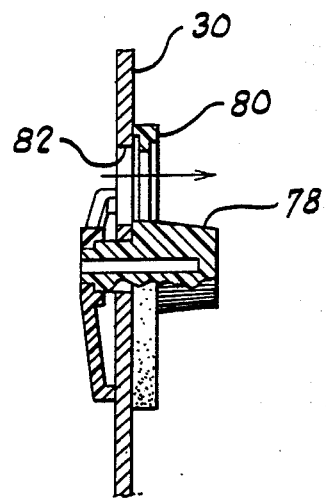
FIG. 5A  FIG. 5B

MOTORCYCLE ENGINE COOLING SYSTEM

BACKGROUND OF THE INVENTION

The field of the present invention is water cooling systems for vehicles and particularly motorcycles.

Cooling systems for motorcycles including large motorcycles, motor scooters, motor bikes and the like have generally employed air-cooled engines. Air cooled engines have generally been found lighter in weight, less complicated and more compact. Such attributes are generally advantageous on motorcycles of all types because of the need for lightweight and compact design. Recently, it has been found advantageous in certain situations to employ a water-cooled system. Reference here to water-cooled systems is intended to encompass such systems whether using water or other form of liquid coolant. Water-cooled systems are more efficient in maintaining a uniform temperature. However, such systems generally require more space and are heavier.

More space is required for both the radiator and the air flow path to and from the radiator. Furthermore, the coolant and the radiator itself add additional weight. In light of the stringent demands for compactness and lightness, optimum arrangements for maximum radiator efficiency in the most compact design and balanced arrangement is necessary.

SUMMARY OF THE INVENTION

The present invention pertains to a water-cooled cooling system for a motorcycle exhibiting a compact arrangement with efficient weight distribution. A radiator is positioned within the hollow interior of a front leg shield to obtain the benefits of efficient air flow, maximum space utilization and efficient weight distribution. With this arrangement, the radiator may be positioned in one of multiple positions within the hollow front leg shield to provide maximum space utilization. Where the motorcycle includes a front luggage carrier, the radiator may be mounted low for air flow about the front wheel. Under such circumstances, the center of gravity of the motorcycle is lowered concurrently. With a higher mounting position, selectable heated air flow may be directed efficiently to the rider when desired.

Accordingly, it is an object of the present invention to provide an improved water-cooled cooling system for a motorcycle having a front leg shield. Other and further objects and advantages will appear hereinafter.

BRIEF DESCRIPTION OF THE DRAWINGS

FIG. 4A is a detailed perspective of a vent employable with the present invention.

FIG. 4B is a side elevation of the vent of FIG. 4A.

FIG. 5A is a front view of a second embodiment of a vent employable with the present invention.

FIG. 5B is a cross-sectional elevation of the vent of FIG. 5A.

DETAILED DESCRIPTION OF THE PREFERRED EMBODIMENTS

Figure 1:
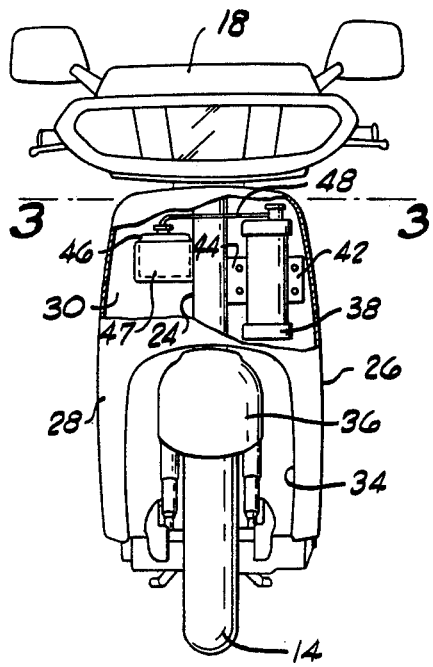
FIG. 1 is a front view of a motorcycle of the present invention with a portion of the front leg shield broken away for clarity.
Figure 3:
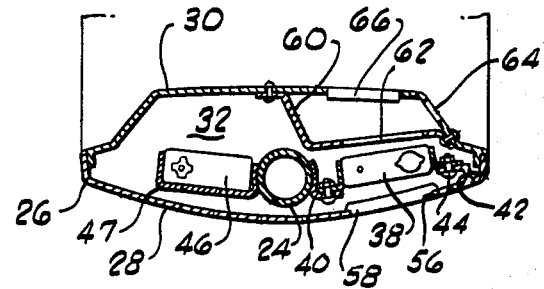
FIG. 3 is a cross-sectional plan view taken along line 3—3 of FIG. 1.
Figure 6:
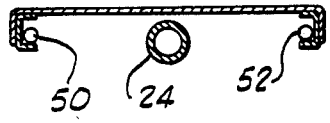
FIG. 6 is a cross-sectional end view taken along line 6—6 of FIG. 2.
Figure 2:
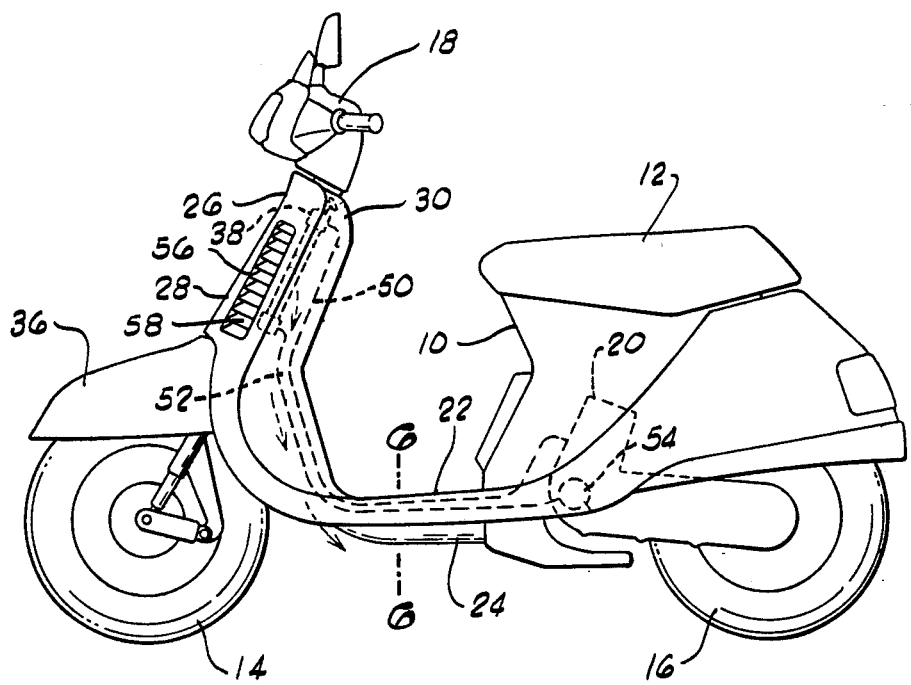
FIG. 2 is a side elevation of the motorcycle of FIG. 1.

Turning in detail to the drawings, and particularly the embodiment of FIGS. 1, 2, 3 and 6, a motorcycle is illustrated of the type having a main body 10, a seat 12, a front wheel 14, a rear wheel 16 and a steering and handle grip assembly 18. A water-cooled engine 20 is located generally below the seat 12 rearwardly of a step floor 22. A down tube 24 forms a front portion of the frame of the motorcycle extending downwardly from the head pipe (not shown) and rearwardly below the step floor 22. At the front of the motorcycle, a front leg shield 26 protects the rider from frontal air flow.

The front leg shield 26 includes a front wall 28 and a rear wall 30. The front and rear walls 28 and 30 are roughly concave such that when assembled they form a hollow interior 32. The hollow interior 32 generally extends from near the steering and handle grip assembly 18 downwardly to the step floor 22. Thus, a cavity is formed through that link. An opening 34 in the front wall 28 of the leg shield 26 provides room for the front wheel 14 and the associated front fender 36.

Located within the hollow interior 32 of the front leg shield 26, beneath the step floor 22 and at the water-cooled engine 20 is an engine cooling system. A radiator 38 is located within the hollow interior 32 of the front leg shield 26. The radiator 38 is fixed to the down tube 24 and the front wall 28 by means of brackets 40 and 42 and fasteners 44. A radiator tank 46 is held in a frame 47 and connected to the radiator 38 by conventional means including a tube 48. Communication between the radiator 38 and the water jacket of the engine 20 is provided by means of tubes 50 and 52. A water pump 54 induces flow through the system. The tubes are shown to be separately directed through the structure. However, the down tube 24 may be employed to either carry one or both of the tubes or to act, when sealed at its ends, as one of the liquid carrying tubes itself.

The lateral positioning of the radiator tank 46 and the radiator 48 on either side of the down tube 24 provides a balance of weight on either side of the center line of the motorcycle. The location of the radiator 38 as well as the radiator tank 46 at the front of the motorcycle helps to distribute the weight load of the vehicle. Alternatively, two radiator elements may be positioned to balance the motorcycle. By locating the radiator 38 in the upper part of the hollow interior 32, unobstructed flow of air is received with the motorcycle in motion. Furthermore, vents may be advantageously located to provide heated air to the rider as will be more fully described below.

Looking to the provision for air flow to the radiator 38, an inlet opening 56 is disposed directly in front of the radiator 38 and includes louvers 58 which provide an aesthetic appearance and air flow direction where applicable. The location of the inlet opening 56 allows it to receive direct air flow with the motorcycle moving forward. This air flow is then immediately directed to the radiator 38 for efficient heat transfer. Located rearwardly of the radiator 38 within the hollow interior 32 is a baffle 60. The baffle 60 divides the hollow interior 32 of the leg shield 26 into first and second volumes. The first and larger volume contains the radiator tank 46, the down tube 24 and the radiator 38. The second and smaller volume provides a passageway for the air exhausting from the radiator to pass downwardly in front of the back wall of the leg shield 26 as indicated by the arrows in FIG. 2. To provide communication between the two volumes such that air exhausted from the radiator 38 may pass directly into the passageway of the second volume, the baffle 60 includes a port 62. A small air outlet 64 allows venting of the upper portion of the hollow interior 32 when air is not forced downwardly due to the forward motion of the vehicle.

Associated with the rear wall 30 of the front leg shield 26 is a selectively closable vent 66. This vent may assume a plurality of configurations. Two configurations are illustrated in FIGS. 4A, B and 5A, B. The device illustrated in FIGS. 4A and 4B are in the form of a damper having pivotally mounted plates 68 and 70. The plates are coupled to a lever 72 which may be actuated by a knob 74 through a slot 76 in the back wall 30 of the front leg shield 26. The vent 66 may be actuated through simple motion of the knob 74 to allow or restrict exhausted flow through the radiator 38 to the rider.

In FIGS. 5A and 5B, a rotary damper is illustrated including a knob 78 which actuates the vent plate 80 to selectively expose or cover vent holes 82.

Figure 7:
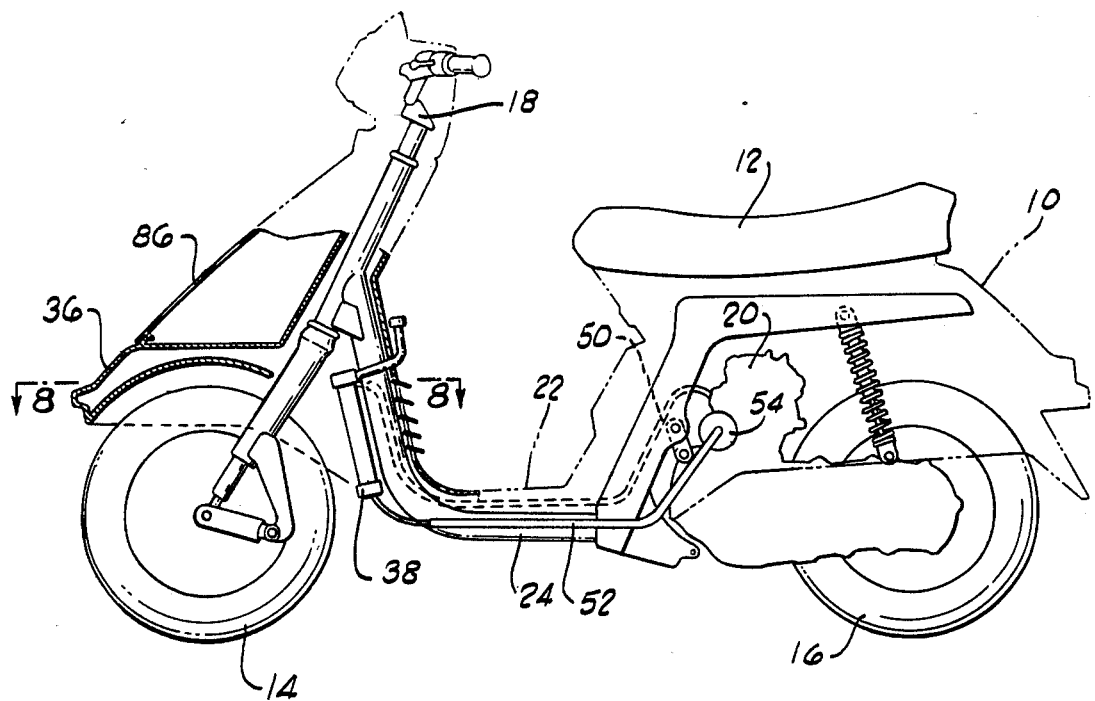
FIG. 7 is a side elevation of another embodiment of a motorcycle of the present invention.
Figure 8:
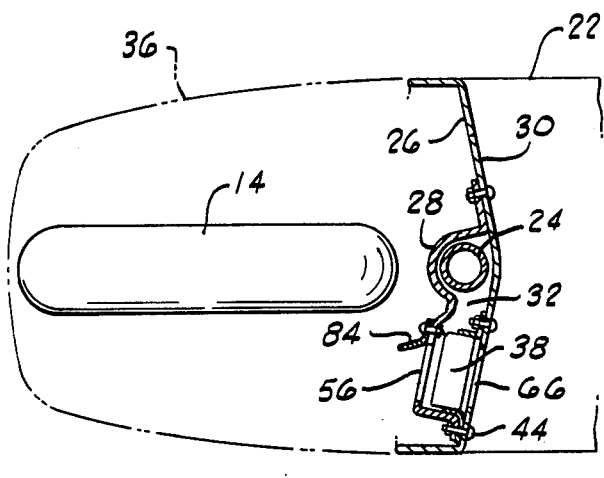
FIG. 8 is a cross-sectional plan view taken along line 8—8 of FIG. 7.

Turning then to the embodiment of FIGS. 7 and 8, a similar motorcycle structure is illustrated with corresponding elements to that of the first embodiment being referenced by corresponding numbers. The radiator 38 is located in a lower part of the front leg shield 26 as can best be seen in FIG. 7. This position places the radiator 38 rearwardly of the front wheel 14 and the radiator 38 extends downwardly to below the top of the front wheel. In this location, the center of gravity of the motorcycle is lowered as weight is located in the lower position. The inlet opening 56 allows air flow which flows adjacent to the front wheel 14 to be directed at the radiator 38 which may be exhausted through port 66. A forwardly extending mud guard 84 extends into a position between the rear portion of the front wheel 14 and the radiator 38 to prevent mud from clogging the radiator.

The location of the radiator 38 also makes possible the positioning of a luggage carrier 86 forwardly of the steering mechanism 18 and above a front fender 36.

Figure 9:
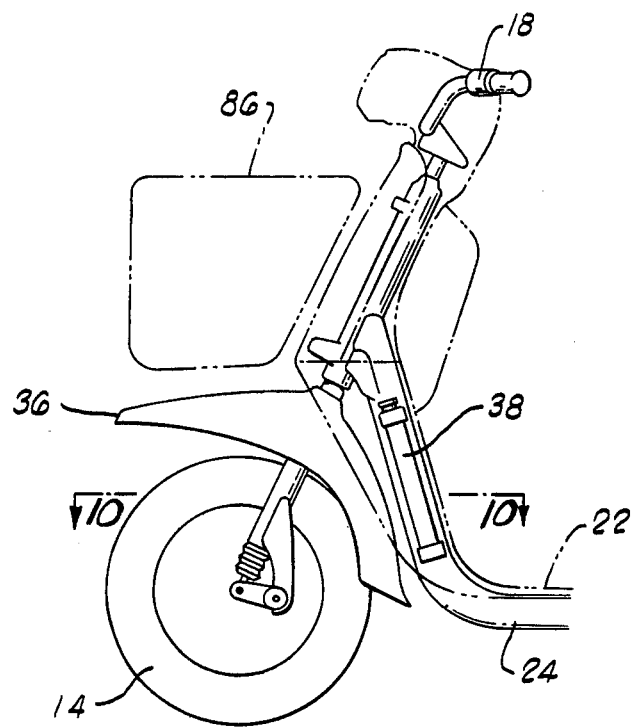
FIG. 9 is a side elevation of a portion of a motorcycle employing yet another embodiment of the present invention.
Figure 10:
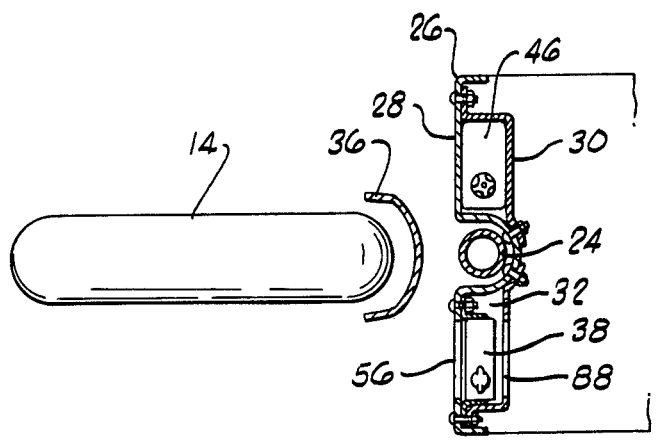
FIG. 10 is a cross-sectional plan view taken along line 10—10 of FIG. 9.

Turning next to the embodiment of FIGS. 9 and 10, a radiator 38 positioned in the lower portion of the front leg shield 26 is illustrated. Once again, corresponding numbers apply to this embodiment as to the embodiments previously discussed. In the embodiment of FIGS. 9 and 10, the radiator 38 is counterbalanced by a radiator tank 46. Additionally, the front fender 36 pivots with the wheel 14 such that protection from mud and the like is accomplished by means of the fender 36 itself. An inlet opening 56 allows air to be directed into the hollow interior 32 of the front leg shield 26 for direction through the radiator 38 and out the outlet opening 88.

Accordingly, three principal embodiments of a motorcycle incorporating a radiator mounted in a hollow interior of a front leg shield for advantageous and efficient employment of a water-cooled system is disclosed.

While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A motorcycle comprising
    a front leg shield having a hollow interior;
    a step floor aft of said front leg shield;
    a water-cooled engine aft of said step floor;
    an engine cooling system for said water-cooled engine, including a radiator, said radiator being positioned in said hollow interior of said front leg shield.

2. The motorcycle of claim 1, said front leg shield including a front wall and a back wall joined together to form said hollow interior.

3. The motorcycle of claim 2, said front wall having an opening directly in front of said radiator.

4. The motorcycle of claim 1, said radiator being in the upper part of said leg shield.

5. The motorcycle of claim 1, said radiator being in the lower part of said leg shield.

6. A motorcycle comprising
    a front leg shield having a hollow interior, an inlet opening at the front thereof and an outlet opening at the bottom thereof;
    a step floor aft of said front leg shield;
    a water-cooled engine aft of said step floor; and
    an engine cooling system for said water-cooled engine, including a radiator, said radiator being positioned in said hollow interior of said front leg shield.

7. The motorcycle of claim 6, said front leg shield further having a baffle within said hollow interior, said baffle dividing said hollow interior into a first volume and a second volume and having a port therethrough adjacent said radiator to allow air flow through said radiator to pass from said first volume to said second volume.

8. The motorcycle of claim 6, said inlet opening being directly in front of said radiator.

9. The motorcycle of claim 6 further comprising a down tube through said hollow interior, said engine cooling system further including a radiator tank, said radiator being laterally disposed on a first side of said down tube and said radiator tank being laterally disposed on the other side of said down tube.

10. A motorcycle comprising
    a front wheel;
    a front leg shield having a hollow interior;
    a step floor aft of said front leg shield;
    a water-cooled engine aft of said step floor; and
    an engine cooling system, including a radiator, said radiator being positioned in said hollow interior of said front leg shield rearwardly of said front wheel and extending downwardly below the top of said front wheel.

11. The motorcycle of claim 10 further comprising a luggage carrier above said front wheel.

12. The motorcycle of claim 10 further comprising a down tube and said engine cooling system further including a radiator tank, said radiator being laterally disposed of said down tube on one side and said radiator tank being laterally disposed of said down tube on the other side.

13. A motorcycle comprising a front leg shield having a hollow interior, said front leg shield including a front wall and a back wall joined together to form said hollow interior, said back wall having a selectively closable vent to provide heated air to the rider;

a water-cooled engine;

an engine cooling system for said water-cooled engine, including a radiator, said radiator being positioned in said hollow interior of said front leg shield.

14. A motorcycle comprising a front wheel;

a front leg shield having a hollow interior, said leg shield having a selectively closable vent on the back side thereof in communication with said hollow interior to provide heated air to the rider;

a water-cooled engine; and an engine cooling system, including a radiator, said radiator being positioned in said hollow interior of said front leg shield rearwardly of said front wheel and extending downwardly below the top of said front wheel.

15. A motorcycle comprising a front wheel;

a front leg shield having a hollow interior, said leg shield having a selectively closable vent on the back side thereof in communication with said hollow interior to provide heated air to the rider;

a water-cooled engine;

an engine cooling system including a radiator, said radiator being positioned in said hollow interior of said front leg shield rearwardly of said front wheel and extending downwardly below the top of said front wheel; and a mud guard extending forwardly of said radiator to between said radiator and the rear portion of said front wheel.

* * * * *